United States Patent [19]

Uchimi et al.

[11] Patent Number: 4,734,798

[45] Date of Patent: Mar. 29, 1988

[54] MAGNETIC RECORDING AND REPRODUCING APPARATUS

[75] Inventors: Takashi Uchimi; Hiroyuki Umeda, both of Yokohama, Japan

[73] Assignee: Victor Company of Japan, Ltd., Japan

[21] Appl. No.: 886,927

[22] Filed: Jul. 18, 1986

[30] Foreign Application Priority Data

Jul. 19, 1985 [JP] Japan ................................ 60-159741

[51] Int. Cl.⁴ .............................................. G11B 5/03
[52] U.S. Cl. ..................................................... 360/66
[58] Field of Search ............................ 360/64, 66, 119

[56] References Cited

U.S. PATENT DOCUMENTS 4,455,582  6/1984  Yunagida et al. ...................... 360/66
4,622,614 11/1986  Yamashira et al. .................... 360/66

Primary Examiner—Vincent P. Canney
Attorney, Agent, or Firm—Lowe, Price, LeBlanc, Becker & Shur

[57] ABSTRACT

A helical scan type of recording apparatus includes means for controlling the supply of recording current to one or more rotary recording heads and erase current to one or more erase heads whose width is selected to produce erasure of each tape signal track twice in succession, the control being executed such that when recording is to be ended, the erase current supply is first terminated and thereafter the recording supply current is terminated after a specific time interval has elapsed, thereby eliminating from the end of each recorded portions the occurrence of a short tape segment which has been erased and not thereafter recorded on. Disturbances during playback, e.g. of a displayed video signal, are thereby eliminated.

5 Claims, 23 Drawing Figures

MAGNETIC RECORDING AND REPRODUCING APPARATUS

BACKGROUND OF THE INVENTION

The present invention relates to a magnetic recording and reproducing apparatus, and more specifically, to a video tape recorder or audio tape recorder having a rotary drum, hereinafter referred to as a head drum, having at least one and generally two recording heads (referred to in the following as rotary recording heads) fixedly mounted thereon for recording audio or video signals upon a magnetic tape, and in which the head drum further has one or more rotary erase heads (referred to as rotary erase heads in the following, but which are sometimes called "flying erase heads") mounted thereon for erasing recorded signals from the tape.

The rotary recording head records signals in the form of successive signal tracks which are obliquely oriented with respect to the direction of advancement of the magnetic tape, and have a fixed width and pitch. In the prior art, the width of the rotary erase head is made slightly greater than that of the rotary recording head, and erasure is performed by causing the erase head to scan along successive signal tracks. The magnetic tape passes around the head drum to extend around at least 180° of the drum periphery, oriented with respect to the axis of rotation of the drum such as to produce the obliquely directed signal tracks described above as each rotary recording head successively contacts and moves along the tape surface. A recording apparatus employing such helical scanning of the tape will be referred to in the following as a VTR (video tape recorder).

With one type of VTR, rather than utilizing a rotary erase head as described above, a stationary erase head is employed, with the head width being made greater than the width of the magnetic tape. However the rotary erase head provides the advantage that each junction between a previously recorded portion of the tape and a newly recorded portion of the tape will be "clean", i.e. will not generate a temporary disturbance on the display produced by the VTR during subsequent playback of the tape, such as is produced when a stationary erase head is utilized. These disturbances result from the recording head scanning across short portions of the tape, corresponding to the aforementioned junctions, each of which has been erased and which has not been thereafter recorded on.

However a problem which arises with prior art types of magnetic recording and reproducing apparatus employing rotary erase heads is that the degree of erasure of previously recorded material is insufficiently high, using conventional ferrite erase heads. The present applicant has found that this problem can be overcome by employing a rotary erase head of width such that the erase head scans each signal track twice in succession, as described in detail hereinafter. However a problem arises with such an apparatus when data is inserted into a previously recorded portion of the magnetic tape, i.e. is recorded over a part of the previously recorded tape. Specifically, a short portion of signal track which has been erased, and not subsequently recorded on, will remain at the end of each of such inserted recorded portions. These erased portions of the tape result for example in disturbances in the displayed video signal when playback of the tape is performed, in the case of a video tape recorder, and represent a serious problem.

SUMMARY OF THE INVENTION

It is an objective of the present invention provide a magnetic recording and reproducing apparatus which overcomes the problem which arises as described above, when erasure by helical scanning of each signal track of a magnetic tape by a rotary erase head is performed twice in succession, by eliminating the production of portions of erased and unrecorded tape at the end of any newly recorded segment that is recorded over a previously recorded portion of the magnetic tape.

To achieve this objective, a magnetic recording and reproducing apparatus according to the present invention comprises means for controlling the supply of recording current and erase current to the rotary recording heads and rotary erase heads of the apparatus such that, upon termination of recording, the supply of erase current to the rotary erase heads is first terminated, while the supply of recording current to the rotary recording heads is continued during a specific interval following that termination of the supply of erase current.

More specifically, a magnetic recording and reproducing apparatus according to the present invention comprises means for generating a recording current, means for generating an erase current, a motor-driven head drum having at least one rotary magnetic head mounted thereon for recording signals on a magnetic tape in response to the recording current and for reproducing the signals and further having at least one rotary erase head mounted thereon for scanning signal tracks which have been recorded by the rotary recording head for erasing the signal tracks in response to the erase current, the signal tracks being successively formed with a fixed track width and a fixed pitch, in which the rotary erase head is formed with a head width which is equal to at least twice a value W, where W is the product of the number of the rotary recording heads multiplied by the pitch of the signal tracks, divided by the number of the rotary erase heads, whereby during erasure of the signal tracks the rotary erase head scans over substantially the entire width of each of the signal tracks twice in succession, the apparatus further comprising control means for controlling the supply of the recording current and the erase current to the rotary recording head and rotary erase head respectively such that upon termination of supply of the erase current to the rotary erase head, the recording current to the rotary recording head is continued during a specific period of time, for thereby executing recording upon a portion of the magnetic tape which has been immediately previously erased by the rotary erase head.

DESCRIPTION OF THE PREFERRED EMBODIMENTS

Before describing an embodiment of the present invention, the basic features of a prior art type of helical scan recorder, i.e. VTR, will be described.

The required track width of a rotary erase head in such a prior art VTR, i.e. the width of the track on the magnetic tape which is scanned and erased by each of the rotary erase heads, is obtained as:

$$H_v \times P \div H_e$$

where $H_v$ is the number of rotary recording heads, P is the pitch of the signal tracks recorded by the rotary recording heads, and $H_e$ is the number of rotary erase heads. The area of signal tracks formed by rotary recording heads during one revolution of the head drum is approximately equal to the area scanned by the rotary erase heads. Thus, each signal track is erased only once by any one of the rotary erase heads. If the contents of the signal tracks are to be erased, then an erase current is supplied to the rotary erase heads during this scanning. However it is found in practice that erasure is incomplete, i.e. a certain part of the previously recorded signal will remain upon the magnetic tape.

Figure 1:
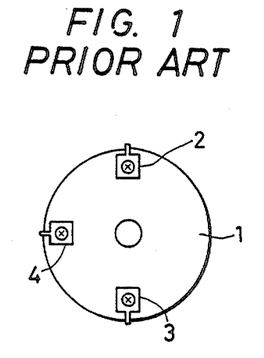
FIGS. 1 and 2 are diagrams for illustrating the relative positions of erase heads and recording heads on head drums of two types of prior art recording apparatus.
Figure 2:
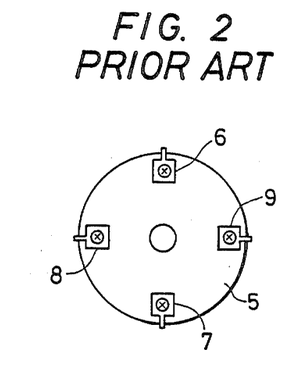

FIG. 1 and FIG. 2 illustrate two types of prior art positional relationship between rotary recording heads and rotary erase heads mounted upon the periphery of a head drum. FIG. 1 shows the case in which one erase head 4 is mounted on the drum 1, while in the case of FIG. 2, two erase heads 8 and 9 are mounted on the head drum 5. In the arrangement of FIG. 1, two rotary recording heads 2 and 3 are mounted on rotary drum 1, mounted diametrically opposing, i.e. spaced apart by 180° about the head drum periphery. The rotary erase head 4 is separated by 90° from each of the rotary recording heads 2 and 3. With the arrangement of FIG. 2, the two rotary recording heads 6 and 7 are mutually spaced apart by 180° about the periphery of head drum 5, while the rotary erase heads 8 and 9 are mutually spaced apart by 180° and each of the rotary erase heads 8 and 9 is spaced apart from each of the rotary recording heads 6 and 7 by 90°, about the periphery of head drum 5.

Figure 3:
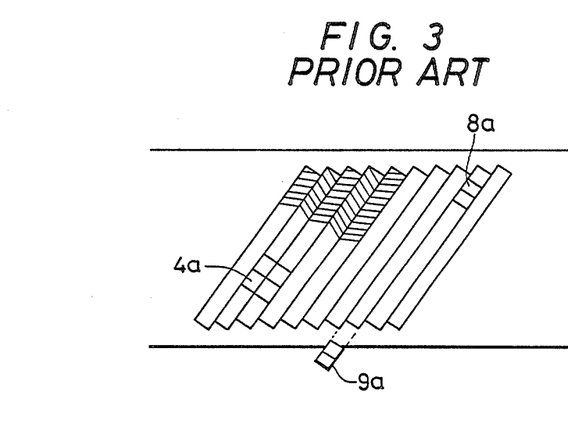
FIG. 3 is a diagram illustrating a pattern of signal tracks formed by helical scanning of the recording heads of FIGS. 1 and 2 along a magnetic tape.

FIG. 3 is a diagram illustrating the pattern of signal tracks which are produced on a signal track by the rotary recording heads 2 and 3, or 6 and 7 described above, and illustrating the positional relationship between the positions of the rotary erase heads 4 or 8, 9 and the tape pattern, for the case of a prior art type of magnetic recording and reproducing apparatus. This type of tape pattern is formed by azimuth recording without the use of guard bands between successive signal tracks. In FIG. 3, 4a denotes the area of magnetic tape which is in contact with the rotary erase head 4 shown in FIG. 1, at an arbitrary point in time, while 8a and 9a indicate the simultaneous positions of rotary erase heads 8 and 9 shown in FIG. 2 at an arbitrary time point. As shown, if only a single rotary erase head is utilized as in FIG. 1, then that erase head must be formed with a track width which is sufficient to erase two adjacent signal tracks simultaneously, i.e. one track of each of the first and second channels, where the first and second channels are respectively recorded by rotary recording heads 2 and 3. If on the other hand two rotary erase heads are utilized, i.e. heads 8 and 9 shown in FIG. 2, then the track width of each rotary erase head must be such that each erase head will erase a single signal track. In a practical system, one of the rotary erase heads 8 and 9 will be arranged to erase the signal tracks of a first channel, and the other rotary erase head to erase tracks of the second channel.

With either of the prior art types of magnetic recording and reproducing apparatus described above, the rotary erase heads will only erase each signal track a single time, as tape transport proceeds. This results in incomplete erasure, as described above.

It is possible to increase the erasure efficiency by using special materials or configurations for the erase heads. For example, a material such as sendust may be employed to form the erase heads, rather than the generally utilized ferrite material. Furthermore, it is possible to form only that portion of the erase head which defines the magnetic gap and the track width of the erase head from a special material such as sendust. However such measures have the disadvantage of resulting in increased manufacturing cost.

Figure 4:
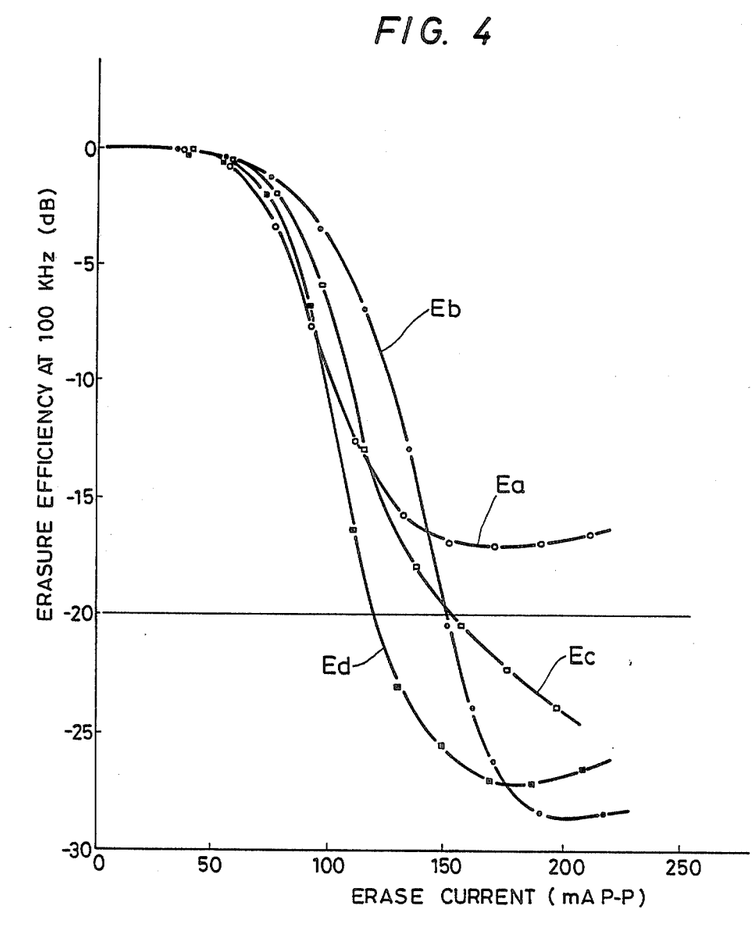
FIG. 4 shows graphs to illustrate variations of erasure efficiency with respect to erase current, for different methods of erasure and types of erase head material.

FIG. 4 is a graph showing the relationship between erasure efficiency and erase current, for rotary erase heads which are formed of ferrite and of sendust respectively. Graphs $E_a$ and $E_c$ show the variation of erasure efficiency with erase current for the case of a ferrite rotary erase head and a sendust rotary erase head, respectively, when only a single scan is performed by the erase head along each signal track. Graphs $E_b$ and $E_d$ show the corresponding variation of erasure efficiency for the case of a ferrite erase head and a sendust erase head respectively, when the erase head scans along each signal track twice in succession. It will be assumed that the erase head performance is acceptable if the erasure efficiency is at least 20 dB, this value being indicated by a horizontal line in FIG. 4. It can be understood from curve $E_b$ in FIG. 4 that satisfactory erasure is obtained, using a ferrite rotary erase head, if each signal track is erased twice in succession. Performing such double erasure of each signal track therefore has the advantage that it becomes possible to use a ferrite erase head, thereby avoiding the increased manufacturing cost which is entailed by using an erase head formed of a special material such as sendust, while satisfactory erasure is attained. If on the other hand a sendust erase head is used and erasure of each signal track is performed twice, then as illustrated by curve $E_d$, it becomes possible to obtain a satisfactory degree of erasure with a substantially reduced level of erase current consumption, by comparison with the use of a sendust erase head and single erasure of each signal track (illustrated by curve $E_c$). This enables the power required for erasure to be lowered.

It can thus be understood that double erasure of each signal track, as described above, provides significant advantages over the prior art method of single erasure.

It is also possible to increase the erasure efficiency by employing a stationary erase head having a plurality of head gaps, so that repetitive erasure is effectively performed due to the plural head gaps. However as stated previously, use of a stationary erase head results in the problem of disturbances being generated upon playback of the junctions between portions of the magnetic tape on which material was previously recorded and newly recorded portions of the tape.

By using one or more rotary erase heads and the double erasure technique described hereinabove, however, this problem is eliminated, so that noise-free electronic editing of the magnetic tape can be performed, e.g. to insert new segments of video data into a previously recorded tape.

Figure 5:
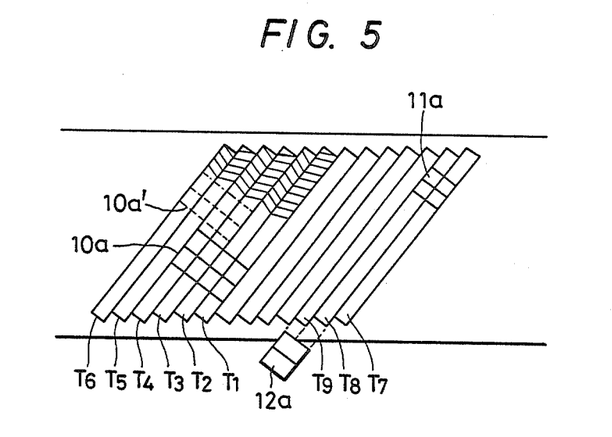
FIG. 5 is a diagram for illustrating tape signal track patterns and erase head position relationships for a method of double erasure of each signal track.
Figure 6:
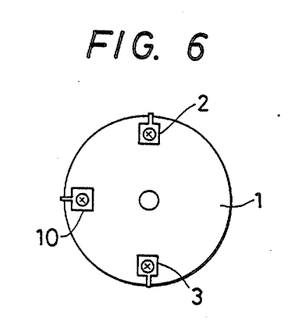
FIGS. 6 and 7 are diagrams for illustrating position relationships between erase heads and recording heads on a head drum, for two types of apparatus applicable to double erasure scanning.
Figure 7:
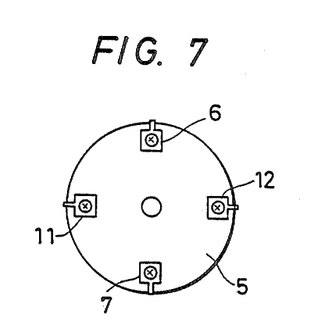

A Japanese Utility Model Application has been made by the assignee of the present applicants, for a magnetic recording and reproducing apparatus designed to implement the double erasure technique described above, using rotary erase heads, for thereby providing the advantages of that technique and eliminating the disadvantages of prior art methods of increasing the erasure efficiency, such as employing a stationary erase head with a plurality of gaps. This utility model application was filed 26th June 1985 with filing number 60-97040. That apparatus will be described, referring to the drawings. FIG. 5 is a diagram illustrating the pattern of signal tracks produced on a magnetic tape with such an apparatus, and the positional relationships between the tape pattern and the rotary erase heads, while FIGS. 6 and 7 show two possible arrangements of rotary recording heads and rotary erase heads on a rotary drum. Components which directly correspond to components in FIG. 1 and FIG. 2 are indicated by identical reference numerals. FIG. 6 shows an arrangement in which one rotary erase head 10 and two rotary recording heads 2 and 3 are mounted on a rotary drum 1. As shown, the rotary erase head 10 and rotary recording heads 2 and 3 are positioned identically to the corresponding rotary erase head and rotary recording heads in the example of FIG. 1 above, i.e. the rotary recording heads being diametrically opposed, and with the rotary erase head 10 being separated by 90° from each of the rotary recording heads. However this embodiment differs from the example of FIG. 1 in that the track width of the rotary erase head is made slightly greater than four times the track width of each rotary recording head. More specifically, the track width of the rotary erase head is made equal to at least twice the value obtained from the following computation:

$$H_v \times P \div H_e$$

where $H_v$, $P$ and $H_e$ are defined as stated hereinabove.

FIG. 7 shows the case in which two rotary erase heads 10 and 12 and two rotary recording heads 6 and 7 are mounted on head drum 5. From the above computation, the track width of each of the rotary erase heads 10 and 12 must be equal to or greater than twice the track width of each rotary recording head.

In the following it will be assumed that the signal to be recorded is an interlace video signal, in which each frame of the signal consists of two successive fields, with each pair of fields respectively occupying a pair of adjacent signal tracks on the magnetic tape. Thus referring again to FIG. 5, when a single rotary erase head is utilized as in FIG. 6, then during scanning of one field the rotary erase head 10 will scan along four signal tracks simultaneously (e.g. as indicated by 10a, will scan the signal tracks T1, T2, T3 and T4 simultaneously), and erase the signals recorded thereon. During the next but one field interval following that, the rotary erase head 10 will have moved with respect to the tape pattern, e.g. as indicated by 10a', such as to scan along the signal tracks T3, T4, T5 and T6 simultaneously, and erase these tracks. In this way the rotary erase head 10, having a track width which is equal to the width of four adjacent signal tracks, is shifted along the direction of tape advancement by the track width of two signal tracks once in every two fields, so that each signal track in every pair of adjacent signal tracks, e.g. signal tracks T3 and T4, will be erased twice during four successive fields. The signal tracks T5 and T6 will then each be erased twice during four successive fields, and so on. In this way, each signal track is erased twice in succession, so that effective erasure is accomplished as described hereinabove.

If two rotary erase heads are employed, i.e. heads 11 and 12 in FIG. 7, then the track width of each erase head must be twice the pitch of the signal tracks. In this case, each of the rotary erase heads 11 and 12 will simultaneously scan and erase two adjacent signal tracks. For example while rotary erase head 11 is scanning as indicated by 11a in FIG. 5, this head will simultaneously erase both of the signal tracks T7 and T8 during one field, while during the succeeding field, rotary erase head 12 will scan and erase the two signal tracks T8 and T9. Thus, signal track T8 will be erased twice in succession during two successive fields, as will signal track T9 so that as in the case of the embodiment of FIG. 6, each signal track will be erased twice in succession.

Use of either of the embodiments of FIG. 6 or FIG. 7 will result in a significant increase in the erasure efficiency, due to the double erasure of each signal track, so that the degree of erasure will be satisfactory even if a ferrite rotary erase head is employed.

If the above apparatus is employed with a conventional method of driving the rotary erase head and rotary recording heads, then when recording is started upon a portion of the magnetic tape that has been previously recorded on, then at the junction between the previously recorded signal track portion and the start of the newly recorded signal track portion, a short portion of the signal track will be erased only once. The length of this portion will correspond to only one or two field intervals, and due to the brief duration of this signal track portion, no problems will normally result from this. This will also be true at the start of an inserted recording signal, which is inserted by recording upon a previously recorded portion of the magnetic tape, during electronic editing. No problem will arise from such short segments of tape which have only been erased once, each corresponding to only one or two fields, with no adverse effects being visible when the edited video tape is played.

However a problem does arise with the double erasure method described above. Specifically, when insert signal recording is performed on a portion of a tape containing previously recorded material, then with the conventional method of controlling erase current and recording current supplies to the erase and recording heads, when recording of the insert signal is temporarily halted or is terminated, the erase current and recording current supplies to the heads are interrupted simultaneously. As a result, the rotary erase head will perform erasure of one track during a time interval which extends from the end of the field (or frame) in which recording by the rotary recording heads was terminated up to the start of the succeeding field (or frame) interval. Thus, at the end of a recorded portion of the magnetic tape, e.g. an insert recorded portion, there will remain a short portion of the tape which has been erased and upon which no signal is recorded. During playback of the tape, such portions will generated disturbances in the displayed video picture, and this therefore represents a disadvantage of the double-erasure method described above.

If for example a single rotary erase head is used, then as shown in FIG. 5 the erase head will erase four signal tracks simultaneously during every two successive fields, i.e. each signal track being erased twice in succession. When insert recording is halted, two signal tracks, corresponding to one frame (two fields), will have been erased with no recording performed thereon following erasure. In the case of two rotary erase heads being used, then again referring to FIG. 5 it will be understood that upon termination of recording, one signal track, corresponding to ½ frame (one field) will be left erased and with no subsequent recording performed thereon following erasure. Thus, when either a single rotary erase head and a pair of rotary erase heads is employed in a magnetic recording and reproducing apparatus, the double erasure method described hereinabove will result in disturbances of the subsequently reproduced video signal.

With a magnetic recording and reproducing apparatus according to the present invention, when recording of a signal is temporarily halted or is terminated, the supply of erase current to the rotary erase head is first terminated, and thereafter the supply of recording current to the rotary recording heads is continued during a specific time interval. In this way, a signal is recorded upon the portion of track which has been immediately previously erased by the rotary erase head. For example if a single rotary erase head is employed, then after the supply of erase current to the rotary erase head is halted, the supply of recording current to the rotary recording head is continued during a time interval corresponding to one frame (2 fields). After two signal tracks have been recorded in this way, the supply of recording current is terminated. In the case of a VTR employing two rotary erase heads, following termination of the supply of erase current to the erase heads, the supply of recording current to the rotary recording heads is continued for ½ frame (one field) interval, i.e. after one signal track has been completely recorded following termination of the erase current supply, the recording current supply is terminated to halt further recording. In the case of a VTR having two rotary recording heads, it will in general be necessary to provide a separate amplifier for each of the recording heads, to supply recording current individually thereto, in order to enable above conditions for the timing of interruption of recording current to be satisfied.

It is preferably arranged that the termination of the erase current supply to the rotary erase head does not take place while the rotary erase head is moving across the magnetic tape, and that the supply of recording current to the rotary recording heads is not halted while either of the rotary recording heads is moving across the magnetic tape, in order to prevent switching of erase or recording operations at an intermediate point along a signal track, as described hereinafter. In particular, during insert recording, the beginning and end of each newly recorded portion on the tape should not occur at an intermediate point on a signal track, i.e. the start of an insert portion should begin at the start of a signal track, while the end should occur at the end of a signal track. In this case the final signal track will of course have two recordings superimposed thereon, i.e. the end of the insert recording and a portion of the previous recording (which has not been erased from that track). It can thus be understood that when recording is executed by a magnetic recording and reproducing apparatus according to the present invention, the recording current is supplied to the recording heads during an integral number of frame intervals with an apparatus having a single erase head and during an integral number of field intervals, in the case of an apparatus having a pair of erase heads.

When rotary recording heads are used to record a digital signal, e.g. a PCM audio signal, it is possible to use one rotary recording head to record a video signal and the other to record the PCM audio signal, by time-sharing operation. In such a case also, it will be necessary to employ an individual recording amplifier to supply recording current to each of the rotary recording heads.

A magnetic recording and reproducing apparatus according to the present invention preferably employs a head drum having the positional relationships between the rotary recording heads and rotary erase head shown in FIG. 6 and described hereinabove, in the case of a single rotary erase head being employed, or that shown in FIG. 7, when a pair of rotary erase heads are employed.

Figure 8:
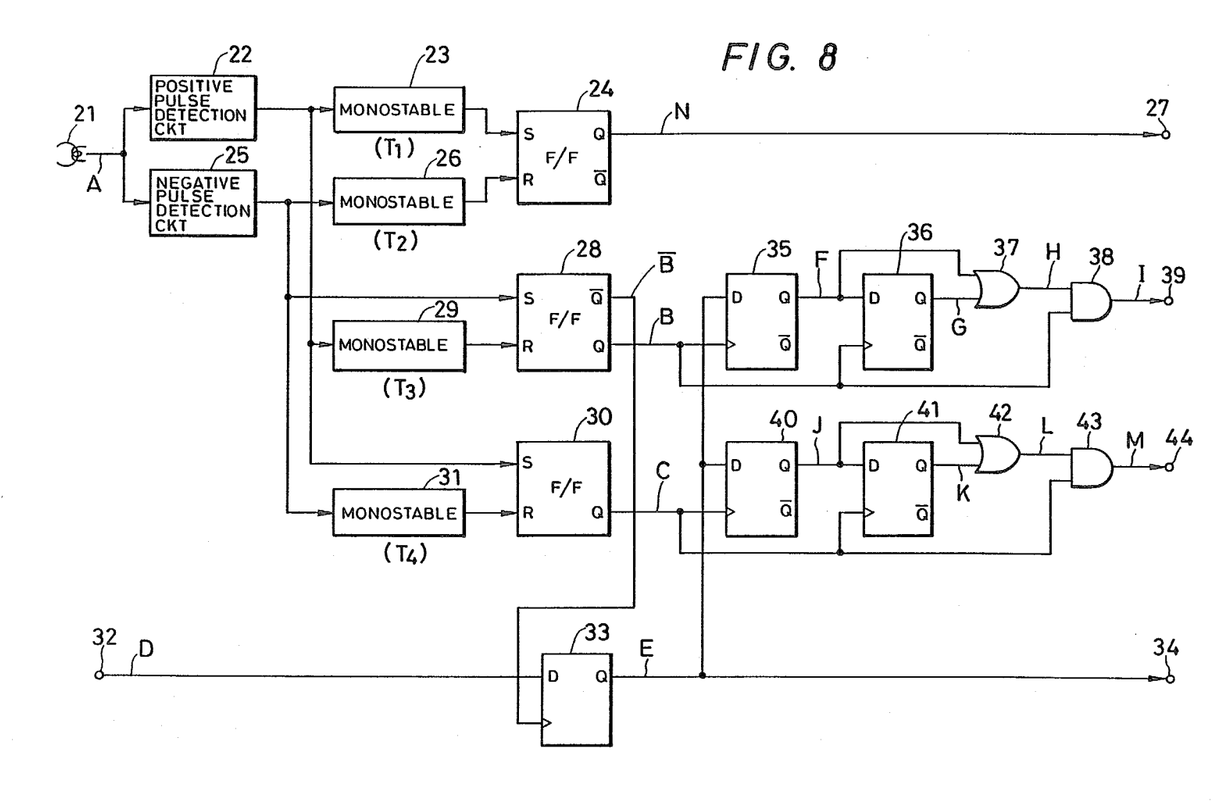
FIG. 8 is a block circuit diagram of a control signal generating circuit for a recording and reproducing apparatus according to the present invention.
Figure 9:
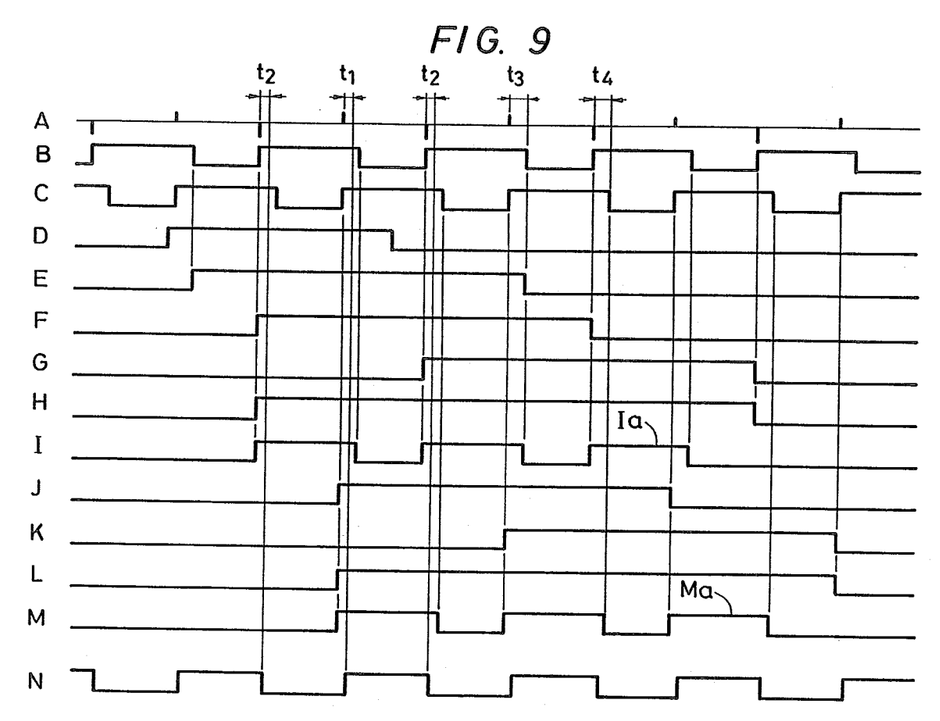
FIGS. 9A through 9N are waveform diagrams for assistance in describing the operation of the circuit of FIG. 8.

An embodiment of a control signal generating circuit for a magnetic recording and reproducing apparatus according to the present invention will now be described, referring to the block circuit diagram of FIG. 8 and to the corresponding waveform diagram of FIG. 9. It will be assumed in the following that the apparatus employs only one rotary erase head, and two rotary recording heads (for respectively recording first and second channels, for the first and second fields respectively of each frame) mounted on a head drum as shown in FIG. 6. In FIG. 8, numeral 21 denotes a drum rotation sensing head (referred to in the following simply as a pick-up head), which produces sensing signals in accordance with rotation of phase magnets which are mounted on the periphery of the head drum or the periphery of a disk which is formed integrally with the head drum. The pick-up head 21 is fixed to the stationary drum or the chassis of the recording apparatus. The output waveform of the output signal from pick-up head 21, denoted as A, is shown in FIG. 9. As shown, this consists of alternating negative and positive short-duration pulses. The positive pulses are detected by a positive pulse detection circuit 22, and the negative pulses by a negative pulse detection circuit 25. The detected positive pulses are inputted to a monostable multivibrator 23, which produces in response pulses which are delayed by a time interval $t_1$ with respect to the positive pulses of signal A. This output signal from the monostable multivibrator 23 is applied to a SET terminal S of a R/S flip-flop (hereinafter abbreviated to FF) 24. The detected negative pulses from the negative pulse detection circuit are supplied to a monostable multivibrator 26, which produces an output signal consisting of pulses which are respectively delayed by a time $t_2$ relative to the negative pulses of signal A. The output pulses from the monostable multivibrator 26 are applied to a RESET terminal R of the FF 24. The resultant output signal N from FF 24 is a train of head switching pulses, having the waveform shown in FIG. 9, and is applied to an output terminal 27.

The timings at which the negative pulses and positive pulses of signal A are produced are respectively synchronized with the timings at which a first and a second one of the two rotary recording heads begin to contact the magnetic tape.

The output signal from the negative pulse detection circuit is also supplied to the SET terminal S of an R/S flip-flop 28, while the output signal from the positive pulse detection circuit 22 is also applied to the RESET terminal R of FF 28 xthrough a monostable multivibrator 29 which produces a delay of $t_3$. The Q output of FF 28, designated as signal B, has the waveform shown in FIG. 9. By suitably selecting the value of the delay time $t_3$ of this waveform, each of the intervals in which signal B is at the high logic level potential (abbreviated hereinafter to the H level) will be precisely synchronized with the time intervals in which the first rotary recording head (of the first channel) is in contact with the magnetic tape. In actual fact the duration of these H-level intervals of signal B will be slightly longer than the intervals in which the first rotary recording head contacts the tape.

Similarly, the output signal from positive pulse detection circuit 22 is supplied to the SET terminal S of an R/S flip-flop 30, and the output signal from the negative pulse detection circuit is supplied through a monostable multivibrator 31 (which produces a delay time $t_4$) to the RESET terminal R of FF 30. The signal C from the Q output of FF 30 has a waveform as shown in FIG. 9. By suitably selecting the delay time $t_4$ of this waveform, each of the intervals in which signal C is at the H level will be precisely synchronized with the time intervals in which the second rotary recording head (of the second channel) is in contact with the magnetic tape. In actual fact the duration of these H-level intervals of signal C will be slightly longer than the intervals in which the second rotary recording head contacts the tape.

A signal D is supplied to input terminal 32 of the circuit shown in FIG. 9, which changes from the low logic level potential (hereinafter referred to as the L level) to the H level when recording is to begin, and which changes from the H to the L level when recording is to be terminated.

As stated above, the recording current is to be supplied to the recording heads during time intervals consisting of an integral number of frames, in the case of a VTR having a single rotary erase head. In addition, it is necessary for the recording current to be supplied for a longer duration than the supply of erase current, e.g. by one frame (½ frame, for an apparatus having 2 erase heads). Signal D is applied to the data terminal of a D (data) latch 33, while the inverted output from 28 , denoted as signal B is supplied to the clock input terminal of D-type latch 33. A signal E is thereby produced from D-type latch 33, and is supplied to output terminal 34 of the control circuit of FIG. 8. Erase current is supplied to the rotary erase head to execute erasure so long as signal E is at the H level, and the duration of these H level intervals is an integral multiple of one frame interval. The rising edge of signal B is of course synchronized with the falling edge of signal B, and corresponds to the instant at which the first rotary recording head separates from the magnetic tape. At that instant, the rotary erase head is separated from the magnetic tape by an angle of 90°, so that there is no possibility of the erase head contacting the magnetic tape at that time. Signal E is also applied to the D (data) terminal of a data latch 35, while the Q output of FF 28 is supplied to the clock input of D-type latch 35. The signal E is thereby latched by signal B, to produce a signal F from the Q output of D-type latch 35. Similarly, signal F is applied to the D input of a D-type latch 36, to be latched therein by signal B, resulting in a signal G being output from the Q terminal of D-type latch 36. This signal G is delayed with respect to signal F by an amount which is equal to one revolution of the head drum (i.e. two field intervals).

Signals F and G are also input to an OR gate 37, which thereby produces a signal H as the OR sum of signals F and G. Signals H and B are input to an AND gate 38, and a recording current control signal I is thereby produced from AND gate 38 and is supplied to an output terminal 39. During each interval in which signal I is at the H level, i.e. in which signal H is at the H level and the first rotary recording head is in contact with the magnetic tape, recording current is supplied to the first rotary recording head to execute recording. It can thus be understood that in the waveform example of FIG. 9, erasure is performed during two revolutions of the head drum, i.e. with the erase head scanning along and erasing two entire signal tracks (while signal F is at the H level), and with recording being performed by the first rotary recording head during three revolutions of the head drum, (i.e. while signal I is at the H level).

The operation for controlling recording current to the second rotary recording head is similar to that described above for the first rotary recording head, however signal C shown in FIG. 9 is then applicable, in place of signal B. The operation is similar to that described above, with signal E being latched by signal C from FF 30 and with signal J being produced from a latch 40, to be latched by signal C in a latch 41, with a signal K being thereby produced from latch 41. Signals J and K are input to OR gate 42, whose output is applied to one input of an AND gate 43, with signal C being applied to the other input, whereby AND gate 43 produces a recording current control signal M which is output from terminal 44. When signal M is at the H level, recording current is supplied to the second rotary recording head, as described hereinafter.

It can be seen from FIG. 9 that, upon termination of the erase current supply (when signal E falls to the L level), which occurs immediately following completion of erasing the entire lengths of two adjacent signal tracks, then during the next field interval, recording current is supplied to the first recording head (in response to the H-level interval of signal I indicated as $I_a$ in FIG. 9). Recording of a signal is thereby executed along the entire length of one of the aforementioned two signal tracks which were most recently erased. In the succeeding field, signal M goes to the H level (indicated as $M_a$ in FIG. 9), resulting in recording being performed along the entire length of the second of the aforementioned two signal tracks.

Figure 10:
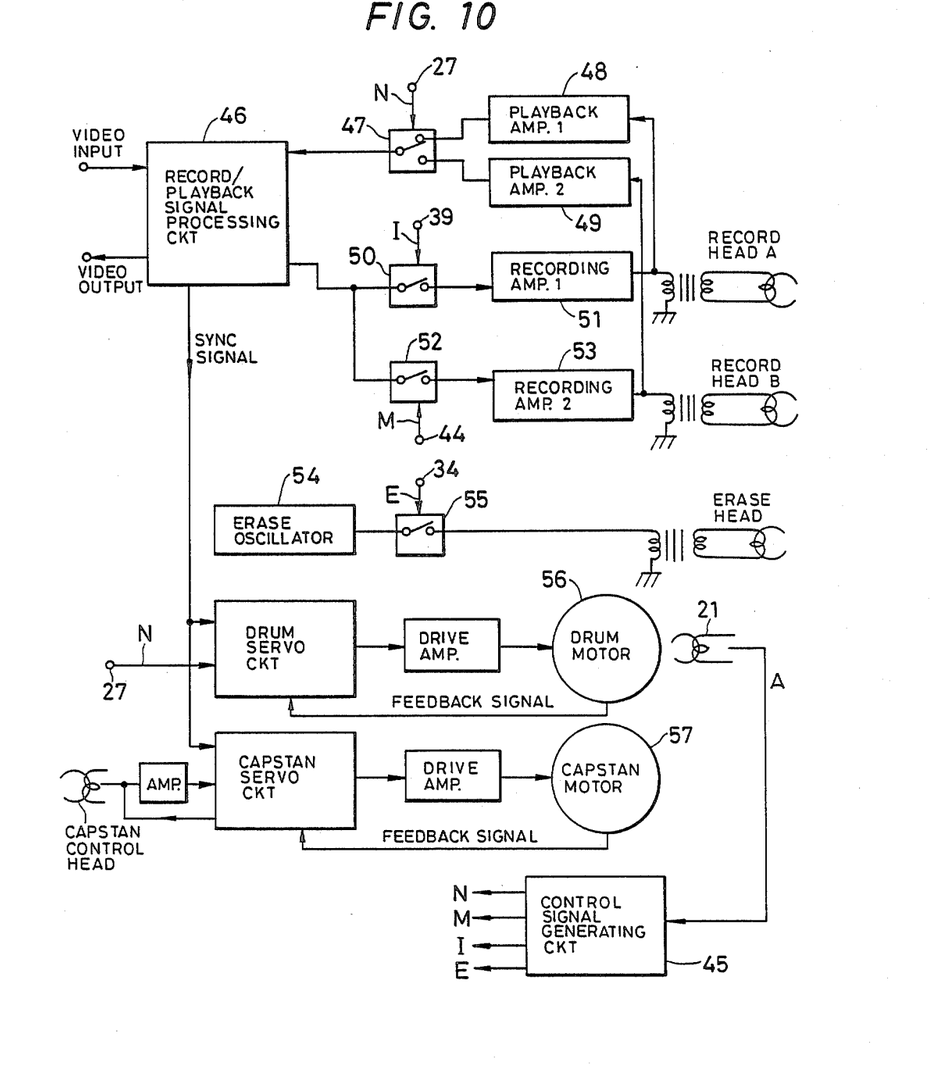
FIG. 10 is a general block diagram of an embodiment of a recording and reproducing apparatus according to the present invention.

FIG. 10 is a general block diagram of an embodiment of a magnetic recording and reproducing apparatus according to the present invention, incorporating the control signal generating circuit shown in FIG. 8, denoted by reference numeral 45. A record/playback signal processing circuit 46 receives a video input signal when recording is performed, and produces an output signal suitable for driving the rotary recording heads after amplification. During playback, the record/playback signal processing circuit 46 receives an amplified playback signal from the rotary recording heads, and produces a corresponding video signal as output. During playback, the output signals from the first and second rotary recording heads (indicated as heads A and B in FIG. 10) are respectively amplified by playback amplifiers 48 and 49, and the outputs from these amplifiers are selected by a switch 47 to be transferred to the record/playback signal processing circuit 46. Switch 47 is controlled by head selection signal N such as to transfer the output from playback amplifier 48 when signal N is at the L level and the output from amplifier 49 when signal N is at the H level.

During recording, the output signal from signal processing circuit 46 is transferred to a recording amplifier 51 of the first rotary recording head by a switch 50, when signal I is at the H level, and is transferred through switch 52 to a recording amplifier 53 of the second rotary recording head when signal M is at the H level. In this way, control of the durations of recording intervals by the recording heads are controlled by signals I and M as described hereinabove.

An erase signal is produced by an erase oscillator circuit 54, and transferred through a switch 55 to the rotary erase head during intervals in which signal E, controlling switch 55, is at the H level. The head drum carrying the rotary erase head and rotary recording heads is driven by a drum motor 56, controlled by a servo loop, while transport of the magnetic tape is controlled by a capstan driven by a capstan motor 57, also controlled by a servo loop. However such means for drum motor and capstan drive control are well known in the art, and further description of these will be omitted.

It can thus be understood that while signal E is at the H level, erasure is performed by the rotary erase head. During each interval in which signal I is at the H level, recording along the complete length of a signal track is executed by the first rotary recording head, while during each interval in which signal M is at the H level, recording along the complete length of a signal track is executed by the second rotary recording head. At least one of such recording intervals is executed for each of the recording heads, immediately following termination of the supply of erase current to the rotary erase head of such recording intervals of the first and second rotary recording heads is greater than the duration of each erase interval, by one frame interval.

It has been found that the present invention enables smoothly continuous electronic editing of a magnetic tape to be performed, e.g. when a short portion of new material is inserted into a previously recorded tape. The invention ensures that the transition from the end point of such an inserted recorded portion to the start of the remaining previously recorded portion of tape will not result in undesirable disturbances when the edited tape is reproduced, e.g. noise or loss of picture synchronization in the case of a VTR. At the same time, since each erased signal track of the tape is erased twice in succession, highly effective erasure is accomplished, even when a rotary erase head formed of ferrite material is utilized.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A magnetic recording and reproducing apparatus comprising means for generating a recording current, means for generating an erase current, a motor-driven head drum having at least one rotary recording head mounted thereon for recording signals on a magnetic tape in response to said recording current and for reproducing said signals and further having at least one rotary erase head for scanning signal tracks which have been recorded by said rotary recording head, to erase said signal tracks in response to said erase current, said signal tracks being successively formed with a fixed track width and a fixed pitch, in which said rotary erase head is formed with a track width which is equal to at least twice a value W, where W is the product of the number of said rotary recording heads multiplied by the pitch of said signal tracks, divided by the number of said rotary erase heads, whereby during erasure of said signal tracks said rotary erase head scans over substantially the entire width of each of said signal tracks twice in succession, and further comprising control means for controlling the supply of said recording current and said erase current to said rotary recording head and rotary erase head respectively such that upon termination of supply of said erase current to said rotary erase head a supply of said recording current to said rotary recording head is continued during a specific period of time, for thereby executing recording upon a portion of said magnetic tape which has been immediately previously erased by said rotary erase head.

2. A magnetic recording and reproducing apparatus according to claim 1, in which said control means act to control the supply of said erase current to said rotary erase head and said recording current to said rotary recording head in response to a command designating termination of recording a signal by said magnetic recording and reproducing apparatus on a magnetic tape, such as to halt the supply of said erase current to said rotary erase head at the completion of scanning said rotary erase head along substantially the entire length of a first one of said signal tracks, and to subsequently halt the supply of said recording current to said rotary recording head upon completion of scanning by said rotary recording head along substantially the entire length of at least a second one of said signal tracks, where said second signal track immediately succeeds said first signal track.

3. A magnetic recording and reproducing apparatus according to claim 2, in which said signal recorded on said magnetic tape is a video signal formed of successive frames with each frame formed of two successive fields, and in which said fields are recorded to respectively occupy successive ones of said signal tracks of said magnetic tape.

4. A magnetic recording and reproducing apparatus according to claim 3, in which said drum has a single one of said rotary erase heads and two of said rotary recording heads mounted thereon, and in which following said termination of said erase current supply to said rotary erase head, the supply of said recording current to said rotary recording heads is terminated after a time interval corresponding to scanning of an integral number of said frames.

5. A magnetic recording and reproducing apparatus according to claim 3, in which said head drum has a pair of said rotary erase heads and two of said rotary recording heads mounted thereon, and in which following said termination of said erase current supply to said rotary erase heads, the supply of said recording current to said rotary recording heads is terminated after a time interval corresponding to scanning of an integral number of said fields.

* * * * *